United States Patent [19]
Flint

[11] 3,780,293
[45] Dec. 18, 1973

[54] DUAL BEAM RADIOMETER FOR CLEAR AIR TURBULENCE MEASUREMENT

[76] Inventor: Edward F. Flint, 1400 S. Orange, Fullerton, Calif. 92632

[22] Filed: Mar. 6, 1972

[21] Appl. No.: 232,147

[52] U.S. Cl. .............. 250/339, 73/355 R, 250/83 R, 250/86
[51] Int. Cl. ............................................. G01j 5/02
[58] Field of Search ..................... 250/83 R, 83.3 R, 250/83.3 H, 86; 73/355 R

[56] References Cited
UNITED STATES PATENTS

| | | | |
|---|---|---|---|
| 3,641,345 | 2/1972 | Coackley et al. | 250/83.3 H |
| 3,539,807 | 11/1970 | Bickel | 250/83.3 H |
| 3,475,963 | 11/1969 | Astheimer | 250/83.3 H X |
| 3,371,212 | 2/1968 | Weiss | 250/83.3 H |

Primary Examiner—Archie R. Borchelt
Attorney—Philip M. Hinderstein

[57] ABSTRACT

An improved dual beam radiometer comprising radiation detecting means; a source of reference radiation; a rotating chopper for alternately passing radiation from the atmosphere and reflecting radiation from the reference source onto the detecting means; a rotating filter disc having four sectors interposed in the radiation path between the rotating chopper and the detecting means for controlling the wavelength of the radiation applied to the detecting means, the rotating filter disc being operative, synchronously with the rotating chopper, to periodically change the wavelength of the atmospheric radiation and the wavelength of the reference radiation applied to the detecting means; and means for controlling the temperature of the reference source as a function of atmospheric temperature adjacent to the radiometer.

19 Claims, 4 Drawing Figures

PATENTED DEC 18 1973
3,780,293
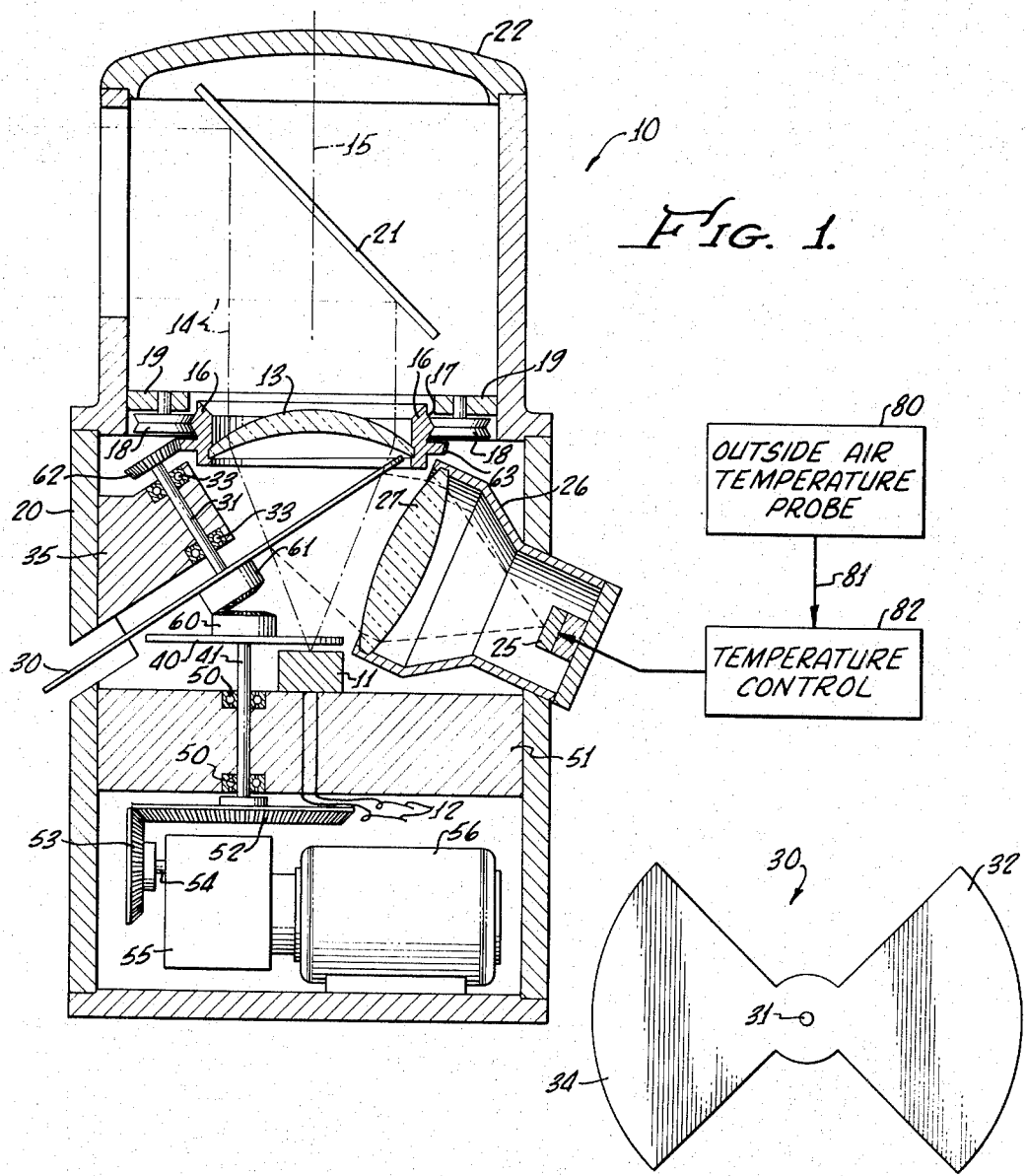
Fig. 1.
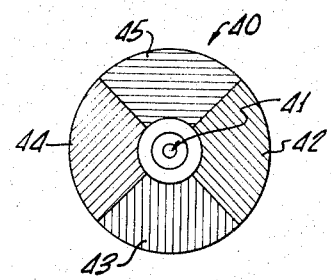
Fig. 2.
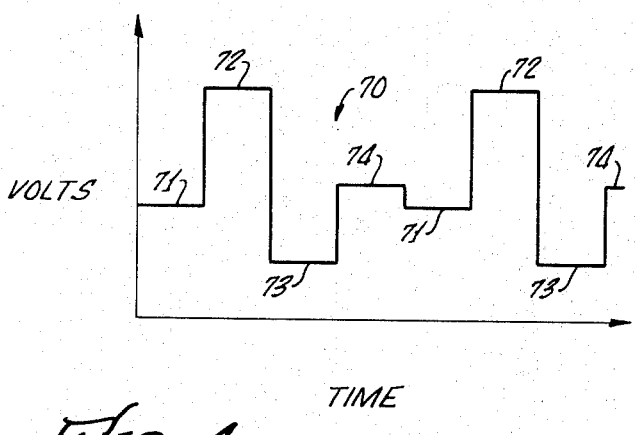
Fig. 4.
Fig. 3.

3,780,293

DUAL BEAM RADIOMETER FOR CLEAR AIR TURBULENCE MEASUREMENT

BACKGROUND OF THE INVENTION

1. Field of the Invention

The present invention relates to an improved dual beam radiometer and, more particularly, to atmospheric temperature measurement apparatus for providing signals indicative of atmospheric radiation as a function of a black body reference.

2. Description of the Prior Art

Since the advent of modern, high-speed, jet aircraft, there has been growing concern on the part of meterologists and aircraft pilots and designers about the problems of atmospheric turbulence above the effectiveness of weather radar. Atmospheric turbulence is an environmental condition which effects both passenger safety and comfort and may be physically destructive to aircraft. There has been a startling increase in the number of known incidents wherein jet aircraft have encountered atmospheric turbulence with resultant passenger injuries. Most air turbulence is caused by jet streams, mountain waves, and convection thunder storms. The detection of such turbulence in clear air is of particular interest because pilots have no visible indication of impending change in air flow magnitude and direction and because high-speed jets operate at altitudes at which clear air turbulence (CAT) is most prevalent.

No system has successfully provided the long-range capability to detect atmospheric turbulence. The absence of liquid moisture at high altitudes, for example, makes existing airborne radar systems ineffective. One scheme, consisting of a laser radar, purported to detect abrupt changes in particle concentration which, it was speculated, exists at the interface between two air currents which cause turbulence. However, tests of such a system indicate that it has little or no utility. Even if atmospheric turbulence and abrupt changes in particle concentration are associated, it has not been demonstrated that the presence of such abrupt changes will always indicate turbulence. Neither has it been established that turbulence is always associated with the abrupt changes in particle concentration.

It has been found that atmospheric turbulence in clear air is associated with marked changes in atmospheric temperature. This has led to airborne tests of devices which continuously monitor the air temperature immediately outside an aircraft and which alert the pilot of any significant change. Tests of one such device have indicated that clear air turbulence is associated with a change of approximately 4°C in the static air temperature. This change usually occurs over a small sector, with the center of the turbulence located approximately in the center of the sector. The point at which the temperature change starts to the point of encountering maximum turbulence, therefore, involves a very short distance. Thus, traversing this span would involve such a short period of time that it is insufficient to successfully permit preparation for and/or avoidance of the turbulence. As a result, thermal probes are ineffective.

It has been reported in the literature that 80 percent of all turbulence encountered by jet airliners between altitudes of 28,000 and 41,000 feet is associated with the jet streams. Northern hemisphere jet streams usually have cirrostratus or ice crystal cloud formations associated therewith and the maximum wind shear and turbulence has been found to be in the proximity of the cirrostratus clouds. Another difficulty with thermal probes is that they often penetrate this area without indicating significant temperature changes. As a result, techniques which have been postulated for detecting thermal discontinuities as a means for detecting CAT will not always provide the correct indication in the vicinity of cirrostratus ice crystal clouds.

Still other methods have been proposed for the advance detection and warning of atmospheric turbulence with airborne devices. These include active use of radar, microwaves, and visible portions of the electromagnetic spectrum; passive use of millimeter waves; invisible light; electrostatic field measurements; ozone detections; and barometric measurements. The most promising system is a passive infrared radiometer which senses atmospheric turbulence at distances averaging up to 32 miles ahead of an aircraft. Such a system includes a very sensitive infrared radiometer having the ability to sense small input radiance differences. Such a system is effective in that it is well established that atmospheric turbulence is associated with radiation changes of the air mass. Between 28,000 and 41,000 feet, the most important operational altitudes for modern jet aircraft, carbon dioxide has several strong absorption-emission bands in the infrared spectrum such that ambient air temperature measurements in the atmosphere may be made by tuning the infrared radiometer to one of such bands, such as that centered at 15 microns. Therefore, a radiometer sensitive at this wavelength will measure the infrared radiation emitted by a column of carbon dioxide molecules. The length of the column of gas at a given wavelength will depend upon the gas density, which varies with pressure or altitude. In the center of the infrared absorption band at 15 microns, the gas molecules absorb very strongly and a relatively short path length may be measured. At wavelengths away from the center of the carbon dioxide absorption band at 15 microns, the coefficient of the absorption decreases and a column of gas of increasing length is required to completely absorb the infrared radiation. Therefore, if an infrared radiometer is built which, through use of optical filters, is sensitive only in the strong absorption region of atmospheric carbon dioxide from 14.5 to 15.5 microns, one can sense the average radiation of a column of air which is relatively short. On the other hand, if the optical filters are sensitive outside of the 15 micron absorption band, the average radiation of a column of air which is relatively long, on the order of several hundred miles deep, will be sensed. Therefore, by selecting a filter which overlaps the edge of the 15 micron $CO_2$ band, so that energy is received both directly in front of the aircraft and from a great distance in front of the aircraft, any specified detection range may be established, within the sensitivity capability of the radiometer.

Such a radiometer may be useful in detecting clear air turbulence since it can detect temperature changes throughout the atmosphere for a considerable distance in front of the aircraft. However, such a radiometer has still an additional advantage in that it is capable of detecting turbulence associated with cirrostratus or ice crystal cloud formations. More specifically, it has been determined that ice crystal density changes as a wind shear is approached, due to the thinning of the clouds, and it is wind shear which causes the turbulence.

Therefore, turbulence can be detected since it is associated with a wind shear which also causes a thinning of the ice, resulting in a changing radiation level.

Based on the above, it has been proposed to detect turbulence by using a radiometer in which the band of wavelengths applied to the detector is alternated between two bands, one sensing the average radiation of a column of air which is relatively short and the other sensing the average radiation of a column of air which is relatively long. In this manner, the difference in atmospheric radiation adjacent an aircraft and far from the aircraft may be determined to look for temperature discontinuities indicative of atmospheric turbulence. Such a system is disclosed in U.S. Pat. No. 3,475,963 issued Nov. 4, 1969 to Robert W. Astheimer for Clear Air Turbulence Radiometer. While such a system is effective in clear air, it has been found to be ineffective when going from clear air into ice crystal clouds with no turbulence or when going from ice crystal clouds to clear air with no turbulence because of the signal which is generated as a result of the difference between the radiation of the clear air and the increased radiation of the ice crystal clouds at the same temperature. Therefore, such systems have proven unsatisfactory and only provide false alarms when flying from clear air to cloud conditions or vice versa.

Another radiometer is disclosed in my prior U.S. Pat. No. 3,350,562 issued Oct. 31, 1967 for Infrared Radiometer Having a Black Body Reference Surface and a Spherical Chopper in which radiation from a fixed column of air in front of an aircraft is compared to a black body reference. Such a radiometer has the advantage of increased stability and sensitivity although still suffering from the problem of providing false alarms when flying from clear air to cloud conditions or vice versa. Furthermore, the above system has the additional disadvantage of being ineffective when the aircraft is climbing or descending because of the normal change in atmospheric temperatures.

SUMMARY OF THE INVENTION

According to the present invention, there is provided an improved radiometer which is effective not only in providing atmospheric temperature indicative signals in clear air or in ice crystal clouds but which is capable of providing satisfactory operation when flying from clear air to cloud conditions or vice versa and while climbing or descending. More specifically, and in accordance with the present invention, radiance in the atmosphere is a function of both emissivity and temperature. Emissivity in the edge or wing of a $CO_2$ absorption band varies as a function of the ice content. The percentage $CO_2$ in the air is constant at a given altitude, but the ice content varies with cloud conditions. Therefore, if a device is to be a true detector of atmospheric temperature changes, there must be compensation of the beam or beams of a radiometer by reducing the ice effect relative to the CAT signal. For the purposes of the present invention, suffice it to say that the ice effect in the atmosphere may be reduced by separately processing the signals from two different beams centered at different wavelengths. However, such processing requires that each signal be derived separately and not be directly subtracted from each other. Therefore, systems such as that in the beforementioned U.S. Pat. No. 3,475,963 are ineffective in that the signals are automatically combined. On the other hand, a radiometer of the type disclosed in my prior patent, while comparing a signal to a black body, is ineffective for present purposes because of the inability to obtain signals at more than one wavelength.

Finally, it is important to have a radiometer which detects thermal air turbulence signals during changes in vehicle altitude. If this can be achieved, the resulting signal from the radiometer will be a difference of thermal energy in the atmosphere in advance of penetration and thermal energy at the aircraft position independently of whether the aircraft is climbing or descending.

The above objects are achieved, in accordance with the present invention, by providing a radiometer which separately compares the radiation from two different spectral bands on the edge or wing of a $CO_2$ absorption band with a black body reference. Furthermore, by controlling the temperature of the reference black body to a fixed temperature difference from an outside air temperature probe, compensation may be achieved for changes in vehicle altitude.

Briefly, the present improved dual beam radiometer comprises radiation detecting means; a source of reference radiation; a rotating chopper for alternately passing radiation from the atmosphere and reflecting radiation from the reference source onto the detecting means; and a rotating filter disc having four sections interposed in the radiation path between the rotating chopper and the detecting means for controlling the wavelength of the radiation applied to the detecting means, the rotating filter disc being operative, synchronously with the rotating chopper, to periodically change the wavelength of the atmospheric radiation and the wavelength of the reference radiation applied to the detecting means. By adjusting the spectral band pass of one beam and its reference relative to the other, the ice effect may be reduced to a level sufficient to prevent false alarms when the aircraft is flying from clear air to cloud conditions or vice versa. In addition, the present radiometer further comprises means for sensing atmospheric temperature adjacent to the radiometer and means connected between the atmospheric temperature sensing means and the reference radiation source for controlling the temperature of the reference radiation source as a function of such sensed atmospheric temperature. This permits a resultant signal indicative of the radiation from the combined beams, with the ice effect eliminated through manipulation of the shorter beam, compared to the air temperature adjacent to the aircraft so that ice effects and altitude changes are entirely eliminated from the air turbulence signal.

OBJECTS

It is therefore an object of the present invention to provide an improved dual beam radiometer. In this regard, it is significant to note that it is the object of the present invention to provide a radiometer capable of providing electrical signals from two spectral band passes as a function of radiation from a black body for further processing to provide an atmospheric turbulence indication. The processing system which operates on such signals and generates such an atmospheric turbulence signal is not the subject of this invention.

It is a further object of the present invention to provide means for detecting two radiation signals at two preselected spectral bands as a function of the radiation of a reference body.

It is a further object of the present invention to provide a radiometer including a reference body and means for controlling the temperature of the reference body as a function of atmospheric temperature adjacent to the radiometer.

It is another object of the present invention to provide an improved dual beam radiometer including a four color sector wheel synchronized with a reflective chopper to provide a radiation signal difference between one color of a $CO_2$ long path distance target and a third color of a reference body and a radiation signal difference between a second color of a $CO_2$ shorter path distance target and a fourth color of the reference body.

It is still another object of the present invention to provide a radiometer including an optical system objective lens with its optical axis off the center of the lens outside circumference in order that its rotation will scan the radiometer field of view in a circle.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a side elevation view taken through the center of a dual beam radiometer constructed in accordance with the teachings of the present invention;

FIG. 2 is a plan view of a chopper for use in the apparatus of FIG. 1;

FIG. 3 is a plan view of a rotating filter disc for use in the radiometer of FIG. 1; and FIG. 4 is a graph showing the output of the radiometer of FIG. 1 as a function of time. de

DESCRIPTION OF THE PREFERRED EMBODIMENT

Referring now to the drawings and, more particularly, to FIG. 1 thereof, the present dual beam radiometer, generally designated 10, comprises a single detector 11 for receiving radiation in the 0 to 20 micron region and for generating an electrical signal on leads 12 as a function of the intensity of such radiation. In this regard, detector 11 may be a thermistor bolometer of conventional design. A lens 13 focuses incoming atmospheric radiation 14 onto detector 11. Lens 13 may be a fixed objective lens or may have its optical axis displaced from the centerline 15 of radiometer 10 in order that rotation of lens 13 will scan beam 14 in a circle. In the latter case, lens 13 may be supported by a sleeve 16 having a circumferential lip 17 extending from the outer surface thereof, lip 17 engaging a plurality of rollers 18 supported for rotation by brackets 19 connected to a cylindrical housing 20. Housing 20 also provides the support for the remaining components of radiometer 10.

If housing 20 is to be mounted in an aircraft or other vehicle with axis 15 vertical, housing 20 may include a mirror 21 mounted at a 45° angle relative to axis 15 to reflect atmospheric radiation from a horizontal direction into lens 13. The outer end of housing 20 may also terminate in a suitable protective dome 22.

Radiometer 10 further comprises a source of reference radiation or black body 25. Black body 25 is positioned within a chamber 26 supported by housing 20, chamber 26 including standard thermoelectric means for maintaining constant the temperature of black body 25, as explained more fully in my prior U.S. Pat. No. 3,350,562.

Interposed in the path of beam 14, between lens 13 and detector 11, is a chopper-reflector 30 which is mounted for rotation at one end of a shaft 31. Shaft 31 is supported for rotation by bearings 33 connected to a bracket 35 secured to housing 20. As shown in FIG. 2, chopper 30 includes two blades 32 and 34 which define two quadrants of a circle, blades 32 and 34 being separated by spaces defining the remaining two uadrants of the circle.

As shown most clearly in FIG. 1, chopper 30 is mounted so that blades 32 and 34 may selectively block the radiation from passing from lens 13 to detector 11. When either of blades 32 or 34 is so positioned, radiation from black body 25 is reflected therefrom into detector 11. For this purpose, the inner end of housing 26 terminates in a lens 27 which focuses the radiation from black body reference source 25 onto detector 11 via either of blades 32 or 34. On the other hand, when chopper 30 is rotated through an angle of 90° in either direction, neither blade 32 nor blade 34 is positioned between lens 13 and detector 11 and the radiation from beam 14 is directed to detector 11. Accordingly, as chopper 30 rotates with shaft 31, in a manner to be described more fully hereinafter, radiation from beam 14 and radiation from reference black body 25 is alternately directed onto detector 11.

Radiometer 10 further comprises a filter disc 40 which is mounted for rotation on a shaft 41. As shown in FIG. 3, filter disc 40 includes four sectors 42, 43, 44 and 45, each representing a quadrant of a circle. Disc 40 is positioned with shaft 41 parallel to axis 15 so that disc 40 is interposed in the radiation path between chopper 30 and detector 11. That is, filter disc 40 is capable of controlling the wavelength of the radiation applied to detector 11. Furthermore, filter disc 40 is driven synchronously with chopper 30 so that sectors 42 and 44 of filter 40 are in the radiation path to detector 11 when blades 32 and 34, respectively, of chopper 30 are in the path of beam 14 and so that sectors 43 and 45 of filter 40 are in the radiation path to detector 11 when the spaces between blades 32 and 34 are in the path of beam 14. In this manner, each of the individual sectors 42-45 of filter disc 40 controls the wavelength of the radiation applied to detector 11 from a different source. Therefore, during each rotation of chopper 30 and filter disc 40, detector 11 twice receives radiation from the atmosphere and twice receives radiation from reference source 25, a total of four different signals for each revolution of chopper 30 and filter 40.

Referring again to FIG. 1, filter disc 40 is connected to one end of shaft 41 which is supported for rotation by bearings 50 mounted in a support member 51 positioned intermediate the opposite ends of housing 20. Member 51 also supports detector 11. The other end of shaft 41 is connected to a gear 52 which engages a gear 53 connected to the output shaft 54 of a reduction transmission 55. Transmission 55 is driven by a synchronous motor 56. Accordingly, operation of motor 56 drives gears 52 and 53 via transmission 55 thereby rotating shaft 41 and filter disc 40 at any desired speed.

In order to drive chopper 30 synchronously with filter 40, shafts 41 and 31 further support identical gears 60 and 61, respectively, the teeth of which engage so that gear 61, shaft 31, and chopper 30 are driven synchronously with gear 60, shaft 41, and filter disc 40. In order to also drive lens 30, where desired, the other end of shaft 31 may support a gear 62 adapted to engage a gear 63 made integral with the outer surface of sleeve 16. In this manner, gear 63, sleeve 16, and lens 13 are rotated synchronously with gear 62 and shaft 31.

In operation, and referring now to FIG. 4, activation of motor 56 and rotation of chopper 30 and filter disc 40 will result in an output signal 70 from detector 11 on leads 12. During one complete revolution of chopper 30 and filter disc 40, a composite signal 70 having four separate and distinct sections will be derived. More specifically, during the first 90° of rotation of chopper 30 and filter disc 40, where neither blade 32 nor 34 is in the path of beam 14 and sector 43 of filter 40 is in the radiation path to detector 11, a signal 71 will be derived indicating the level of radiation from the atmosphere in a column of $CO_2$ having a spectral band pass determined by filter sector 43. This may correspond to the shorter distance beam discussed previously. During the next 90° of rotation of chopper 30 and filter disc 40, with blade 32 in the path of beam 14 and sector 42 in the radiation path to detector 11, radiation from reference source 25 is reflected to detector 11 generating a reference signal 72 on output leads 12. During the remaining 180° of rotation of chopper 30 and filter disc 40, signals 73 and 74 are derived representing the level of radiation from the atmosphere in a spectral band pass determined by filter sector 45 and radiation from reference source 25 within a spectral band pass determined by filter sector 44. The useful output on leads 12 is the difference between signals 71 and 72 on the one hand, and the difference between signals 73 and 74 on the other hand. In other words, radiometer 10 provides two atmospheric radiation signals from different spectral band passes, each signal being separately compared to its own reference signal. Such signals are passed onto a data processor for digitizing, comparison and processing for determination and detection of atmospheric turbulence. However, as stated previously, such data processing is not a part of this invention.

Filter sectors 42–45 may have the same bandwidths or different bandwidths. According to the preferred embodiment of the present invention, the bandwidths of the atmospheric beam nearest 15 microns and its reference black body are larger than the atmospheric beam furthest from 15 microns and its reference black body. For example, if filter sectors 43 and 45 are peaked at 14.2 microns and 13.8 microns, respectively, so that the path distance viewed by detector 11 via filter sector 43 is shorter than the path distance viewed via filter sector 45, the bandwidth of sector 43 may be 1.0 micron whereas the bandwidth of sector 45 may be 0.5 microns. It is this ability to independently vary the signals from the long and short beams which permits elimination of the ice effect from the atmospheric turbulence indicating signal.

The filter sectors 42 and 44 which define the spectral band passes for black body 25 may be peaked at the same peak as their respective atmospheric beams or peaked at one spectral frequency different from either beam. Using the example just given, sectors 42 and 44 may be peaked at 14.2 microns and 13.8 microns, respectively, sector 42 having a bandwidth of 1.0 microns and sector 44 having a bandwidth of 0.5 microns. Alternatively, both sectors 42 and 44 may be peaked at a different frequency, such as 13.0 microns. In the former case, filter disc 40 is a two-color filter with four filter sectors whereas in the latter case, filter 40 is a tri-color filter with four filter sectors.

Referring again to FIG. 1, one of the most important features of the present invention is the altitude correction means for controlling the output of radiometer 10 while an aircraft carrying radiometer 10 is climbing or descending. When comparing two beams centered at different wavelengths without a black body reference, the reference temperature is absolute zero and the output signal difference will vary with altitude change. Therefore, a fundamental reason for inclusion of a black body reference source is to eliminate the effect of altitude on the output signal. According to the present invention, changes in altitude may be compensated for by providing an outside air temperature probe 80 which would be mounted outside of the aircraft carrying radiometer 10 for sensing ambient air temperature. The output of outside air temperature probe, being directly proportional to air temperature, is applied via a line 81 to a temperature controlling circuit 82. By applying the output of temperature controlling circuit 82 to black body reference source 25, the temperature of black body 25 may be maintained at a fixed amount from the variable outside air temperature at any vehicle position. This allows the vehicle or aircraft to change altitude through various thermal layers of temperature in the vertical direction without creating unwanted thermal slope signals in the desired signal output.

It can therefore be seen that in accordance with the present invention, there is provided an improved radiometer which is effective not only in providing atmospheric temperature indicative signals in clear air or in ice crystal clouds but which is capable of providing satisfactory operation while flying from clear air to cloud conditions or vice versa and while climbing or descending. The present radiometer separately compares the radiation from two different spectral bands on the edge of a $CO_2$ absorption band with a black body reference. In this manner, the ice effect may be calculated from one band, the short distance band, and used to compensate and cancel the ice effect from the other band, the long distance band. Obviously, this may be achieved electronically within the processing equipment which is not part of the present invention. On the other hand, in accordance with the present invention, it may be partially achieved by manipulating the relative band passes of the two different bands, both in the case of the atmospheric radiation and in the case of the reference source radiation. Furthermore, by controlling the temperature of the reference black body so that it is maintained at a fixed temperature difference from atmospheric temperature as sensed by an outside air temperature probe, compensation may be achieved for changes in vehicle altitude.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the spe-

I claim:

1. Atmospheric temperature measurement apparatus comprising:
   radiation detecting means;
   a source of reference radiation;
   chopper means for alternately directing radiation from the atmosphere and radiation from said reference source onto said detecting means, said chopper means including a plurality of chopper sectors;
   filter means interposed in the radiation path between said chopper means and said detecting means for controlling the band pass of the radiation applied to said detecting means, said filter means including a plurality of filter sectors for periodically changing the band pass of the atmospheric radiation applied to said detecting means; and
   means for operating said filter means synchronously with said chopper means so that corresponding ones of said filter sectors and said chopper sectors are always in the path of said detecting means at the same time.

2. Apparatus according to claim 1 wherein said filter means is operative to periodically change the band pass of said atmospheric radiation between two, different, non-overlapping, wavelength bands.

3. Apparatus according to claim 2 wherein said different bands are individually adjustable, both in center frequency and in bandwidth.

4. Apparatus according to claim 1 wherein said filter means further includes a plurality of filter sectors for periodically hanging the band pass of the reference radiation applied to said detecting means.

5. Apparatus according to claim 4 wherein said filter means is operative to periodically change the band pass of said reference radiation between two, different, wavelength bands having the same center frequency and different bandwidths.

6. Apparatus according to claim 4 wherein said filter means is operative to periodically change the band pass of said reference radiation between two, different, non-overlapping wavelength bands and to periodically change the wavelength of said atmospheric radiation between the same two wavelength bands.

7. Apparatus according to claim 6 wherein the bandwidth of one of said two wavelength bands is different than that of the other of said two wavelength bands.

8. Apparatus according to claim 1 wherein said chopper means comprises:
   a rotating chopper for alternately passing radiation from the atmosphere and reflecting radiation from said reference source onto said detecting means.

9. Apparatus according to claim 1 wherein said filter means comprises:
   a rotating filter disc having four sectors so positioned that one of the sectors is, at all times, interposed in the radiation path between said chopper means and said detecting means; and further comprising:
   means for rotating said filter disc.

10. Apparatus according to claim 9 wherein said chopper means comprises:
    a rotating chopper driven synchronously with said fiter disc, said chopper having four sectors which correspond to said four sectors of said filter disc, first and second sectors of said chopper passing radiation from the atmosphere onto said detecting means through first and second sectors of said filter disc and third and fourth sectors of said chopper reflecting radiation from said reference source onto said detecting means through third and fourth sectors of said filter disc.

11. Apparatus according to claim 10 wherein the center frequencies of said first and second sectors of said filter disc are different.

12. Apparatus according to claim 11 wherein the bandwidths of said first and second sectors of said filter disc are different.

13. Apparatus according to claim 11 wherein the center frequencies of said third and fourth sectors of said filter disc are the same.

14. Apparatus according to claim 13 wherein the bandwidths of said third and fourth sectors of said filter disc are different.

15. Apparatus according to claim 11 wherein the center frequencies of said third and fourth sectors of said filter disc are different.

16. Apparatus according to claim 1 further comprising:
    means for sensing atmospheric temperature adjacent said detecting means; and
    means connected between said atmospheric temperature sensing means and said reference radiation source for controlling the temperature of said reference radiation source as a function of atmospheric temperature.

17. Apparatus according to claim 16 wherein said controlling means is operative to maintain the temperature of said reference radiation source at a temperature different from said atmospheric temperature by a fixed amount.

18. In an atmospheric temperature measurement system including radiation detecting means; a source of reference radiation; and chopper means for alternately radiation from the atmosphere and radiation from said reference source onto said detecting means, the improvement comprising:
    means for sensing atmospheric temperature adjacent the system; and
    means connected between said atmospheric temperature sensing means and said reference radiaton source for controlling the temperature of said reference radiation source as a function of atmospheric temperature.

19. In an atmospheric temperature measurement system according to claim 18, the improvement wherein said controlling means is operative to maintain the temperature of said reference radiation source at a temperature different from said atmospheric temperature by a fixed amount.

* * * * *